Dec. 6, 1955  E. C. HAWTHORN  2,725,829
CONFECTION HANDLING MACHINE
Filed July 30, 1951  2 Sheets-Sheet 2
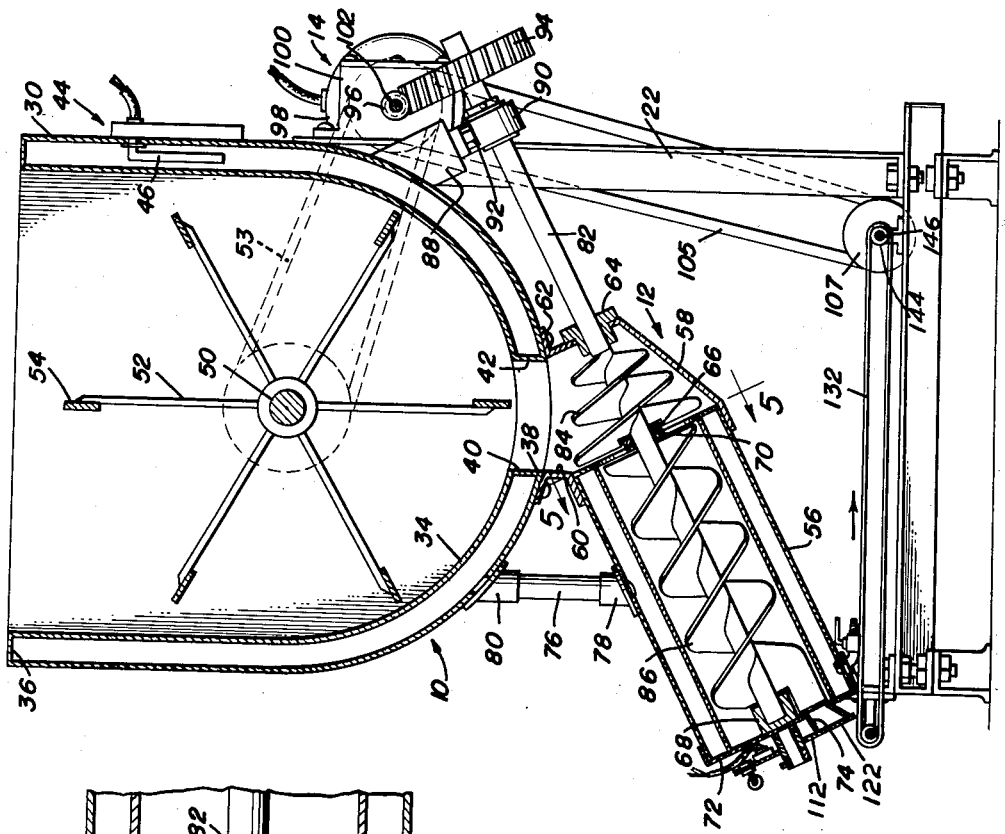
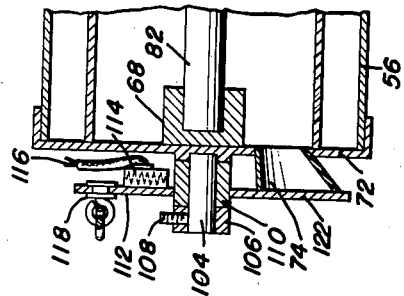
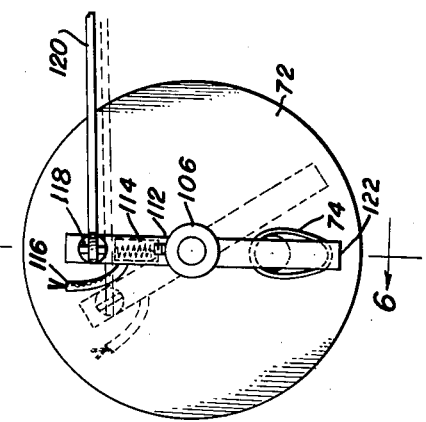
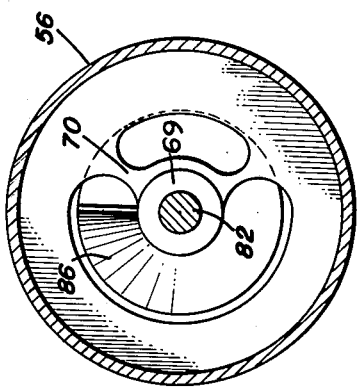
Edmund C. Hawthorn
INVENTOR.

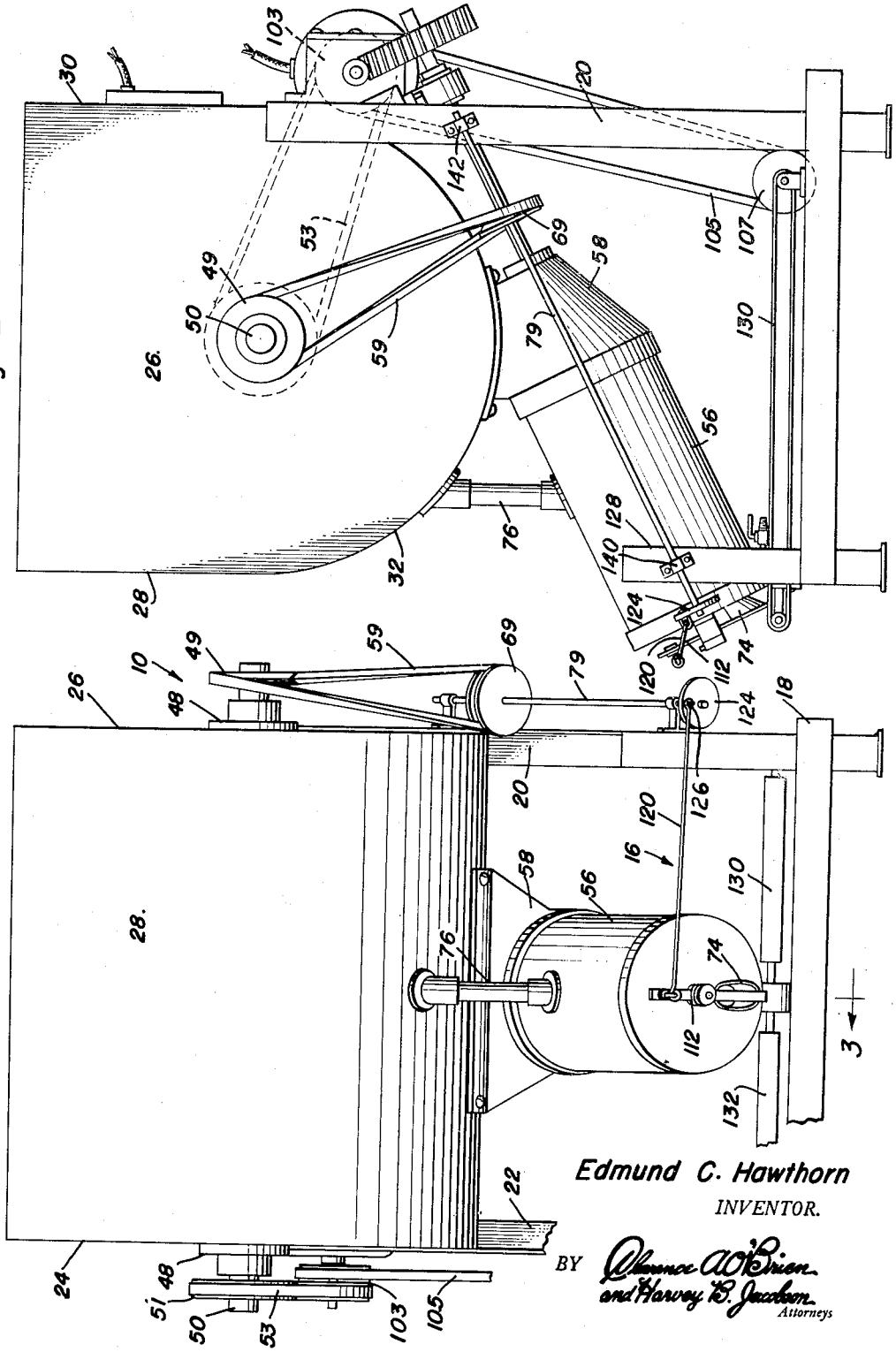

United States Patent Office 2,725,829
Patented Dec. 6, 1955

2,725,829

CONFECTION HANDLING MACHINE

Edmund C. Hawthorn, Harrisburg, Pa.

Application July 30, 1951, Serial No. 239,360

2 Claims. (Cl. 107—14)

The present invention relates to confection handling machines and more particularly to an arrangement including a mixing tank in which the confection is maintained at a preselected temperature and wherein agitating means is provided in the tank for mixing the confection, means being provided for forcing the dispensing of the confection through an outlet opening and common means being provided for effecting operation of the agitating means and means for effecting dispensing.

Another object of the present invention resides in the provision of means carried by the dispensing tube for the agitating tank for selectively opening and closing communication between the interior and exterior of the dispensing tube whereby the confection being dispensed can be of preselected quantities.

A still further object of the invention resides in the provision of means for limiting the amount of confection dispensed and wherein the means effects severing whereby the confection is first dispensed to one side of the dispensing tube and then to the other side, the confection being carried by a conveyor from beneath the dispensing tube outlet.

Various other objects and advantages will become apparent from the detailed description to follow. The best form in which I have contemplated applying my invention is clearly illustrated in the accompanying drawings, wherein:

Figure 1 is a front elevational view of the dispensing machine, parts being broken away;

Figure 2 is a side elevational view of the device in Figure 1;

Figure 3 is a vertical longitudinal sectional view taken substantially along the plane of line 3—3 of Figure 1;

Figure 4 is an end view of the dispensing end of the dispensing tube;

Figure 5 is a sectional view taken substantially along the plane of line 5—5 of Figure 3; and Figure 6 is a vertical sectional view taken substantially along the plane of line 6—6 of Figure 4.

Referring more particularly to the drawings, wherein like numerals designate like parts throughout, the numeral 10 designates generally the agitating tank, the numeral 12 designates generally the means for effecting dispensing of confection from the agitating tank 10, the numeral 14 designates generally the operating means for the agitating means of the tank 10 and the dispensing means 12 and the numeral 16 designates generally the means for effecting severing of the confection being dispensed from the dispensing tube.

Looking now at Figures 1 through 3, it will be seen that a base 18 is provided with standards 20 and 22 at the back end thereof. Fixedly secured to the upper end of the standards 20 and 22 is the agitating tank 10 which has a pair of outer end walls 24 and 26, outer flat front and rear wall sections 28 and 30 and a substantially semicircular lower outer wall section 32 integrally formed with the front and rear wall sections 28 and 30. The tank 10 is formed with an inner wall 34 which is spaced from the outer wall an equal distance throughout, the upper edge of the inner wall 34 being connected to the outer wall by means of the connecting wall 36. The inner and outer walls are formed with openings at 38 and 40, the inner wall having a sleeve portion 42 extending therefrom for connection within the opening 38 of the outer wall whereby confection within the tank can be dispensed therefrom.

Figure 3 shows a conventional electric heating unit 44 which is supported by the outer wall section 30 with the heating coil 46 extending through an aperture in the wall 30 and disposed in the space between the inner and outer walls providing a water jacket whereby the confection can be maintained in a viscous condition at a preselected temperature.

The side walls 24 and 26 are formed with bosses at 48 for rotatably supporting the shaft 50 upon which a plurality of impellers 52 are fixedly secured, these impellers 52 having blades 54 secured to their outer ends.

The means 12 includes a double wall cylindrical casing 56 having a substantially conical upper end section 58 secured thereto. The conical section 58 is formed with an opening at 60 with a flange 62 adapted to be secured to the underside of the tank 10 whereby communication between the interior of the agitating tank and the casing 56 can be maintained. The upper end of the conical section 58 is formed with a bearing bushing at 64. The upper and lower ends of the casing 56 are formed with bearings at 66 and 68. The bearing 66 is secured to and supported by the hub 69 of a spider 70 while the bearing 68 is supported by securement on the end wall 72, said end wall 72 having a dispensing nozzle 74 extending therefrom. An upper intermediate portion of the casing 56 is maintained in supported relation to the outer wall of the agitating tank by means of the water inlet pipe 76 which has its ends 78 and 80 secured to the casing 56 and tank 10, respectively and in communication with their water jackets.

Rotatably journaled in the bearings 64, 66 and 68 is an auger shaft 82 having a conical blade section 84 and a cylindrical blade section 86 whereby the confection from the tank can be forced from the tank through the outlet 74.

Secured to the outer wall of the tank is a bearing bracket 88 to which the bearing element 90 is removably secured by means of the bolts 92, the auger shaft 82 being rotatably journaled thereby. The upper end of the shaft 82 has a worm wheel 94 fixedly secured thereto for co-operation with the worm 96. A small conventional electric motor 98 of the operating means 14 is supported by the mounting bracket 100 carried by the standard 22 with the shaft thereof having the worm 96 fixedly secured thereto. The opposite end of the motor shaft 102 can be provided with a pulley sheave 103 whereby a belt 53 can be engaged thereover for effecting rotation of the shaft 50 whereby the impellers can be rotated within the tank 10. A belt 105 is employed for driving the conveyor pulley 107.

Looking now at Figures 1, 4 and 6, it will be seen that the end wall 72 has a pin 104 fixed therein and extending outwardly therefrom with a retaining ring 106 secured thereto by means of the set screw 108.

A sleeve 110 is rotatably journaled on the pin 104 and has a blade 112 secured thereto. A heating element 114 is secured to the blade 112 and has a conductor 116 extending therefrom and connected to a source of electricity whereby the blade can be warmed while in use.

A bushing 118 is secured adjacent the upper end of the blade 112 and an actuating or pitman rod 120 is operatively connected to the bushing 118. The opposite end of the pitman rod 120 is operatively connected to the eccentric pin 126 mounted on the disk 124. The disk 124 being fixed adjacent the end of the driving shaft 79 which is journaled in a bearing 140 secured on the standard 128 on the forward end of the base 18 and a bearing 142 mounted on the standard 20 on the rearward end of the base 18. The driving shaft 79 being arranged parallel to the axis of the auger shaft 82.

The shaft 79 has a sheave 69 fixed thereon, the sheave 69 being connected in driven relation to the shaft 50 by a belt 59 entrained over sheave 49 fixed adjacent the outer end of the shaft 50.

The rotation of the disk 124 thus imparts an oscillatory motion to the blade 112 about the pivot pin 104. The lower end 122 of the blade 112 is positioned in sliding engagement with the outer end of the dispensing nozzle 74 so that oscillation of the blade 112 produces a wiping or shearing action of the end 122 over the nozzle 74.

A pair of belt conveyors 130 and 132 are mounted in parallel horizontal relation in the base 18 and arranged in closely spaced relation on opposite sides of and below the nozzle 74 with the forward ends of the conveyors extending forwardly of the nozzle 74.

The conveyors 130 and 132 are driven by rollers 144 fixed on shaft 146 on which is fixed sheave 107. The shaft 146 is driven by belt 105 in such direction that the top flights of the conveyors 130 and 132 travel in a front to back direction.

In the operation of the device the motor 98 causes rotation of the shafts 50, 79 and 82. Thus the agitator blades 54, the auger 86 and the belts 130 and 132 will be simultaneously driven.

The rotation of disk 124 causes oscillatory motion of the blade 112 which wipes back and forth over the end of the nozzle 74 to shear off portions of the confection passing through the nozzle 74. The oscillatory motion of the blade 112 produces lateral delivery of the severed portions so that such severed portions are alternately delivered to conveyors 130 and 132.

Having described the invention, what is claimed as new is:

1. A confection handling machine comprising a mixing tank, an agitator in said tank, said tank having an opening adjacent the bottom thereof, an inclined dispensing tube connected to said opening, said dispensing tube having an outlet adjacent the lower end thereof, an auger mounted in said tube for propelling confection from said tank through said outlet, a pivot pin adjacent said outlet, a knife journaled on said pivot pin, said knife being arranged to contact said outlet, means for oscillating said knife across said outlet, heating means applied to said knife, and a conveyor belt at each side of said outlet, said knife severing said confection and depositing successive sections on alternate conveyors.

2. A confection handling machine comprising a mixing tank, an agitator disposed in said tank, said tank having an opening adjacent to the bottom thereof, an inclined dispensing tube connected with said opening, said dispensing tube having an outlet adjacent the lower end thereof, a dispensing nozzle secured to said tube and in communication with said outlet, an auger mounted in said tube for propelling confection from said tank through said outlet and said nozzle, a pivot adjacent said outlet and carried by said tube, a knife disposed on said pivot, said knife being arranged to contact the outer edge of said nozzle, means for oscillating said knife across said nozzle for severing the confection which issues through said outlet and said nozzle and for imparting lateral motion to the severed portions of said confection, heating means operatively connected with said knife, and a conveyor at each side of each nozzle on which the severed portions of confection are alternately deposited.

References Cited in the file of this patent

UNITED STATES PATENTS

| | | |
|---|---|---|
| 286,567 | Yancey | Oct. 9, 1883 |
| 509,987 | Wilcox | Dec. 5, 1893 |
| 534,336 | Marker | Feb. 19, 1895 |
| 560,259 | Day et al. | May 19, 1896 |
| 797,276 | Glauser | Aug. 15, 1905 |
| 1,562,913 | Pierce | Nov. 24, 1925 |
| 1,605,502 | Blue | Nov. 2, 1926 |
| 2,164,257 | Risa | June 27, 1939 |